United States Patent
Salinas et al.

(10) Patent No.: US 11,893,892 B2
(45) Date of Patent: Feb. 6, 2024

(54) UTILITY OR UPFIT VEHICLE USING COMMUNICATION PORTAL

(71) Applicant: The Heil Co., Chattanooga, TN (US)

(72) Inventors: Ricardo Castano Salinas, Fort Payne, AL (US); John Forrest Smith, Fort Payne, AL (US); Brian Huston Ham, Huntsville, AL (US); Ralph Waldo Whitfield, Jr., Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 54 days.

(21) Appl. No.: 17/464,998

(22) Filed: Sep. 2, 2021

(65) Prior Publication Data

US 2022/0084411 A1 Mar. 17, 2022

Related U.S. Application Data

(63) Continuation of application No. 16/439,854, filed on Jun. 13, 2019, now Pat. No. 11,127,302, which is a continuation of application No. 15/331,431, filed on Oct. 21, 2016, now Pat. No. 10,325,422.

(60) Provisional application No. 62/245,654, filed on Oct. 23, 2015.

(51) Int. Cl.
*G08G 1/00* (2006.01)
*G05B 19/418* (2006.01)
*G06Q 10/00* (2023.01)

(52) U.S. Cl.
CPC ............ *G08G 1/20* (2013.01); *G05B 19/418* (2013.01); *G06Q 10/00* (2013.01)

(58) Field of Classification Search
CPC ...... G07C 5/0808; G07C 5/008; G07C 5/085; G08G 1/20; G05B 19/418; G06Q 10/00

USPC .......................................................... 701/32.4
See application file for complete search history.

(56) References Cited

U.S. PATENT DOCUMENTS

| | | | |
|---|---|---|---|
| 6,377,210 B1* | 4/2002 | Moore | G08G 1/20 |
| | | | 701/532 |
| 10,325,422 B1 | 6/2019 | Salinas et al. | |
| 11,127,302 B2 | 9/2021 | Salinas et al. | |
| 2002/0184417 A1* | 12/2002 | Lin | G06F 8/65 |
| | | | 710/74 |
| 2008/0004777 A1* | 1/2008 | Quigley | B28C 5/422 |
| | | | 701/50 |

(Continued)

FOREIGN PATENT DOCUMENTS

CN 101976069 2/2011

OTHER PUBLICATIONS marketplace.geotab.com [online], "Geotab Inc. IOX-RS232," 2020, retrieved on Nov. 16, 2020, retrieved from URL <https://marketplace.geotab.com/solutions/iox-rs232/>, 5 pages.

(Continued)

*Primary Examiner* — Muhammad Shafi
(74) *Attorney, Agent, or Firm* — Fish & Richardson P.C.

(57) ABSTRACT

A method of transmitting data across a J1939 network comprises communicating at least one sensor, if not a plurality of sensors or operator interface devices, related to a utility service body data mounted on a chassis across the J1939 network on unassigned PGN/SPN combinations for various uses. Furthermore, at least one controller can evaluate other J1939 data, such as transmission gear and/or engine RPM before permitting operation of at least one function of the utility service body or upfit body with at least some embodiments.

20 Claims, 3 Drawing Sheets

(56) References Cited

U.S. PATENT DOCUMENTS

| | | |
|---|---|---|
| 2009/0169007 A1 | 7/2009 | Vasicheck |
| 2009/0192662 A1* | 7/2009 | Faus .................. G07C 5/008 |
| | | 701/31.4 |
| 2014/0067231 A1* | 3/2014 | Mosher ................ F02D 43/04 |
| | | 701/1 |
| 2015/0137993 A1 | 5/2015 | Terry |

OTHER PUBLICATIONS

[No Author Listed], "Q&A—What is SAE J1939?" Axiomatic Global Electronic Solutions, Jul. 2006, 3 pages.
[No Author Listed], "SGJ Cable Actuated Sensor SAE J1939 CANBus Output Signal," TE Connectivity, Dec. 2015, 6 pages.
Murvay et al., "Security shortcomings and countermeasures for the SAE J1939 commercial vehicle bus protocol," IEEE Transactions on Vehicular Technology, May 2018, 67(5):4325-4339.
Thomson, "Thomson Electrak® Throttle: Electric Linear Actuator," Installation Manual, Edition Jan. 2016, Jan. 2016, 16 pages.

* cited by examiner

UTILITY OR UPFIT VEHICLE USING COMMUNICATION PORTAL

CLAIM OF PRIORITY

This application is a continuation of U.S. application Ser. No. 16/439,854 filed Jun. 13, 2019, which is a continuation of U.S. application Ser. No. 15/331,431 filed Oct. 21, 2016, now U.S. Pat. No. 10,325,422, which claims the benefit of U.S. Provisional Application No. 62/245,654 filed Oct. 23, 2015, all of which are incorporated herein by reference in their entirety.

FIELD OF THE INVENTION

The present invention relates to a utility or upfit service body mounted on a vehicle chassis which is preferably adapted to CAN, i.e., SAE J1939 or CANopen communications protocol for which the service utility body has at least some sensors, controllers or other elements utilizing the J1939 protocol provide information through the protocol for use with software often externally to the vehicle and controller which may also use information provided by the chassis on the vehicle.

BACKGROUND OF THE INVENTION

As technology gets more and more advanced, vehicle operators and owners are desiring more information at the central office. Specifically, some companies provide Route Optimization Software, with which company owners attempt to maximize the efficiency of their fleets by planning routes for each vehicle to be as efficient as possible, such as in an effort to potentially limit the number of vehicles or amount of fuel used by the company and/or for other purposes.

Some software products make it possible for the company to monitor events like GPS location of a chassis or when a chassis switches gears; these software products use the J1939 protocol which is provided by United States chassis manufacturers. Other companies track actual and preventable maintenance activities of the chassis using data from the J1939 system.

One company, Geotab, sells a module which interfaces with the OBD-II diagnostic connector, to receive J1939 data on that communication line, and sends that data wirelessly across the internet to a processor, where it is accessible to the company in a usable form. In using that technology, another company has installed a set of sensors mounted on the body of a refuse vehicle; these sensors typically take eight to ten hours to mount. These body sensors then provide a separate communications system, such as each sensor directly wired to an Input/Output Expandus (IOX) using serial or CAN protocols, for directing information from the body through communication through the Geotab device.

While this is an advance over just having chassis information, the components of the body do not communicate on J1939 protocol. Furthermore, they do not receive information from the chassis J1939 communication system, they only send information through another protocol on a dedicated set of wires for each sensor and device to the Geotab transmitter.

Companies such as Geotab, Inc. provide a geo-connect device (a/k/a transmitter) which plugs into the OBD-II interface which not only sends the data from the chassis communication system which is most likely a J1939 communication protocol, it also separately provides GPS information through the Geotab device itself to the cloud to a remote location, such as the refuse company.

The installation of all the sensors on the body together with the communication wiring of each of those sensors to the Geotab unit which are each separately run and connected to the IOX port has been found to be cumbersome for the applicant. The applicant has discovered that the typical install time of the sensors and the separate wiring runs to the OBD-II connector typically takes on the order of about eight to ten hours for some of its models.

A need exists to improve the efficiency of providing information for use by various services as could be obtained from at least the refuse vehicle body.

SUMMARY OF THE INVENTION

It is an object of many embodiments of the present invention to provide and improved vehicle using a J1939 communications system as provided with the chassis to communicate at least some utility service body data to either or both of a controller for use by the vehicle or remotely.

While refuse vehicles are the applicant's current business, this technology could extend across the various industries where chasses are outfitted with utility service bodies which perform various functions from emergency service bodies such as fire truck bodies, ambulance bodies, etc., tow truck bodies, cement mixers, railroad service vehicles, cranes, drills, dump trucks, hoists, cranes, vehicles with compressed natural gas (CNG) storage systems, short/regional haul vehicles, like those utilized for package delivery, transmission/distribution vehicles such as those used to install utilities of various providers, and/or other bodies, all of which are designed to perform at least one service function other than those generic functions of the chassis with a cab attached common to all vehicles.

Short haul trucks such as those used by various package companies could have weighing or sensing systems which communicate body data (such as information related to the items carried) or other data. Refrigerated trucks could provide body data related to the temperature of the refrigerated compartment or other data. Bucket trucks could provide information related to the position of the bucket. Refuse vehicles could provide body data related to the position of the dumping stroke, compaction of the body, weight of the body, volume of refuse in the body, etc. One will quickly see that valuable utility service body data related to the function of the utility service body could be communicated via the J1939 rather than relying on cumbersome wiring practices, which may or may not currently be in use.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
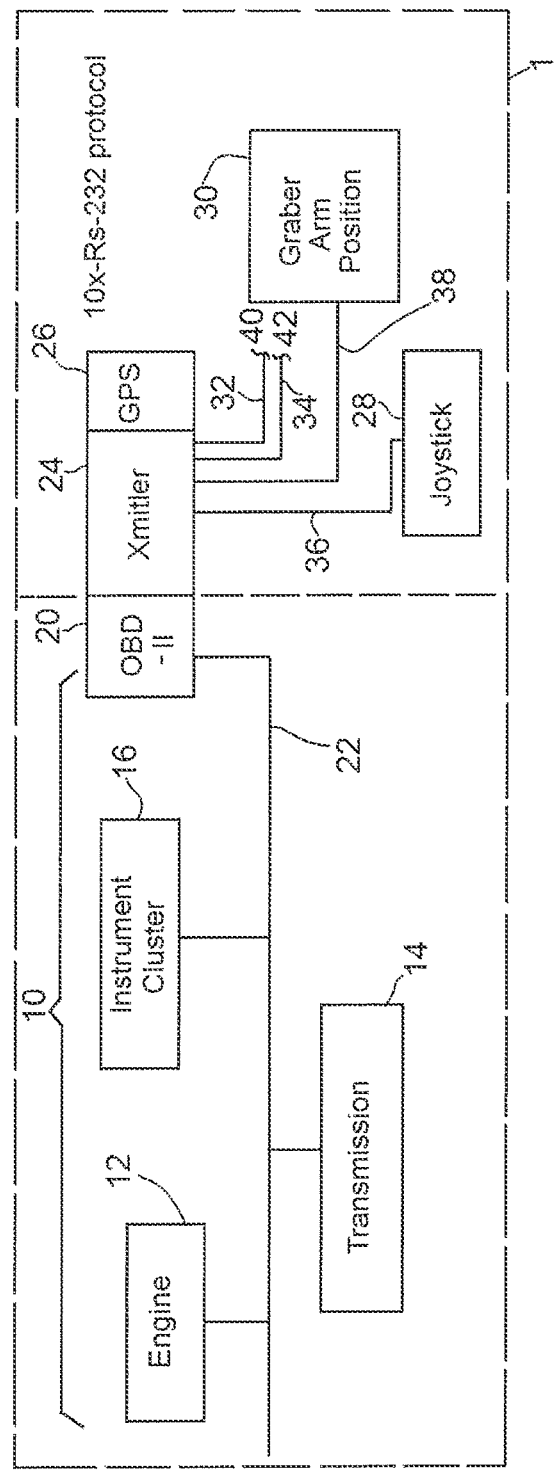
FIG. 1 is a prior art schematic representation of a communications system utilizing a prior art transmitter from a refuse collection vehicle.

FIG. 1 shows a prior art vehicle communications system. The J1939 network 10 is shown as having sensors connected to the engine 12, transmission 14, the instrument cluster 16, the entertainment system 18 and the OBD-II sensor 20. These devices communicate through a communication protocol and along the same wires 22 (normally a wire pair) as would be understood by those of ordinary skill in the art utilizing the J1939 protocol.

A company called Geotab has a transmitter 24 with a built in GPS 26 which can be utilized in conjunction with that information. Other companies provide competitive transmitters 24. The transmitter 24 sends data to remote location utilizing such networks as cell phone communications, the internet, etc., so that the software (located remotely) can take the information provided by the transmitters 24 and utilize that information for various benefits such as optimizing routes and other beneficial operational activities of a vehicle having such a communication system on board.

Figure 4:
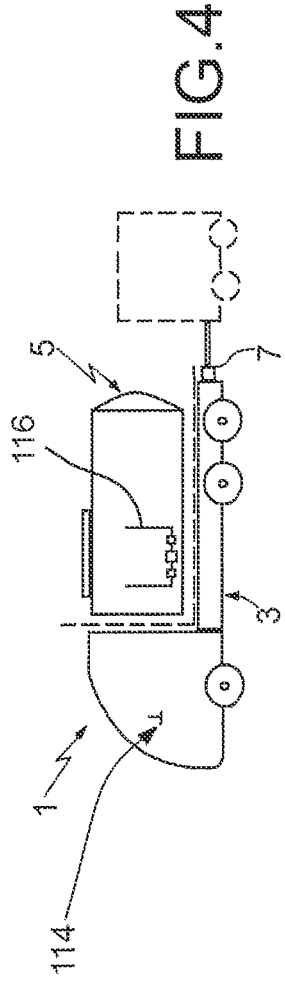
FIG. 4 is a side plan view of a vehicle of a presently preferred embodiment.

FIG. 4 shows a vehicle 1 comprising a chassis 3 as typically provided by truck manufacturers and a utility service body 5 normally installed by a separate company that constructs bodies for use on chassis that perform functions other than driving from one place another. For instance, a refuse vehicle 1 is illustrated, but many other utility service bodies 5 are contemplated with this invention including, but not limited to, emergency service bodies such as fire truck bodies, ambulance bodies, etc., tow truck bodies, cement mixers, railroad service vehicles, cranes, dump trucks, hoists, cranes, vehicles with compressed natural gas (CNG) storage systems, short/regional haul vehicles, like those utilized for package delivery, transmission/distribution vehicles such as those used to install utilities of various providers, and/or other bodies, all of which are designed to perform at least one service function other than those generic functions of the chassis with a cab attached common to all vehicles. Utility service bodies 5 are normally separate from, but are connected to the chassis 3. The chassis 3 can function as a vehicle without the utility service body 5, but the utility service body 5 requires the chassis 3 to allow the utility service body 5 to be in the correct location to perform at least one of its service functions, which could be selected from the group of to collect and/or dump material such as refuse, pump septic tanks, haul packages or other items, tow vehicles, provide railroad services, lift various objects and/or perform other functions. In fact, some embodiments may provide a connection 7 to receive inputs from a towed utility service body, such as a trailer (which could be a trailer used with a tractor trailer rig such as a refrigerated trailer, a tanker body, etc.), a car hauler or other utility service body which has functionality apart from the chassis 3 to perform at least one function.

More recently, some utility service body manufacturers have wanted to know data associated with the body of the vehicle for various uses. Some service providers have hard wired sensors on the body utilizing the IOX-RS232 protocol which is input/output expanders of the Geotab transmitters 24 which allow peripherals to be added to the transmitter 24. A joystick 28 is shown connected to the transmitter 24 as is a grab arm positioner sensor 30 for a refuse vehicle 1. Other peripherals could also be provided such as at connections 32, 34. Connections 32, 34 as do joystick 28 and grab arm positioner sensor 30 separately communicate with transmitter 24, through dedicated wires 36, 38, 40, 42 and are not on the J1939 CAN wiring. In fact, the body sensors or elements 28, 30, 32, 34 can only receive information indirectly, such as from dedicated hard wiring from controller to each of the devices, if at all.

Running all the communication wires, illustrated as wires 36, 38, 40, 42, and likely others is a time intensive process. In one embodiment of a prior art design, it takes approximately eight to ten hours to run the wires and hook up the various sensors and peripherals. There is certainly believed to be a need to improve the efficiency of the process and communication capabilities.

Figure 2:
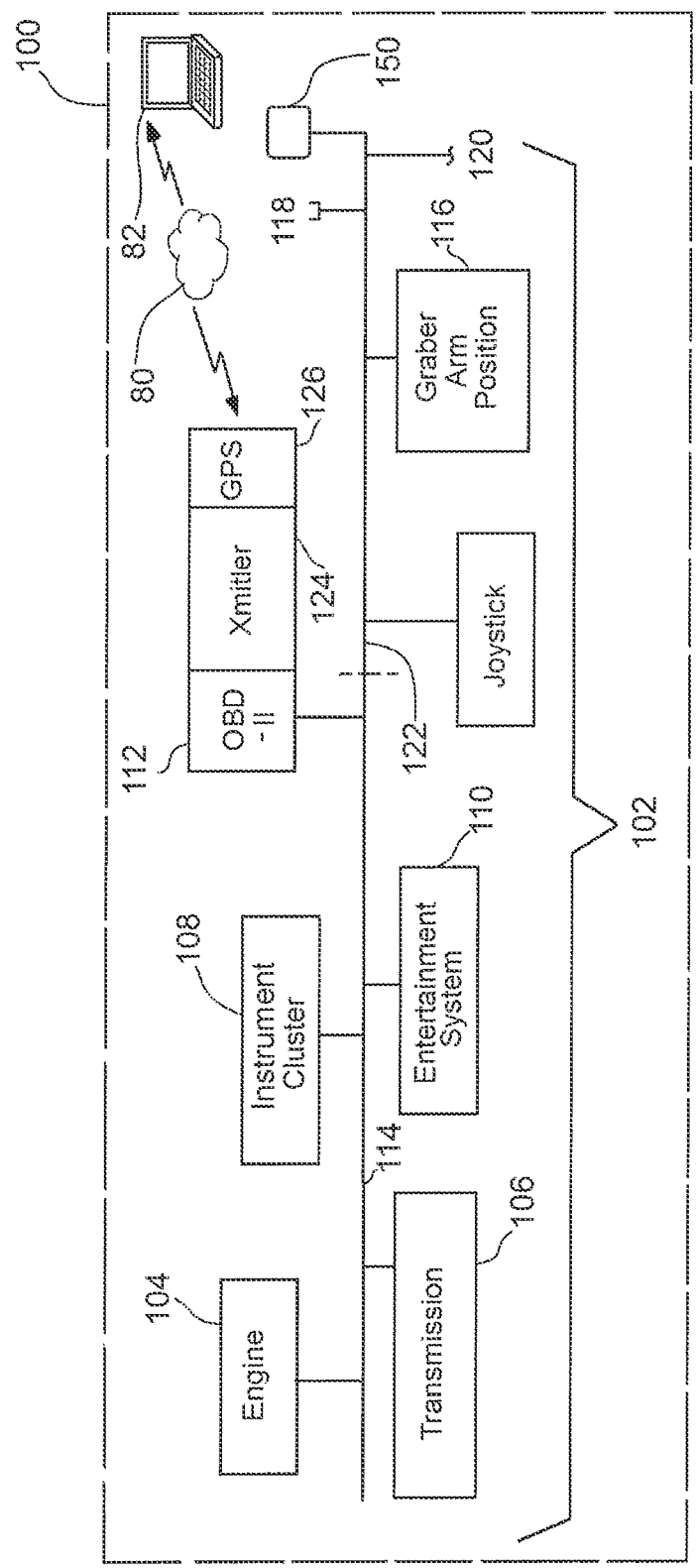
FIG. 2 is a presently preferred embodiment of the present invention of the first embodiment.

FIG. 2 shows a first presently preferred embodiment of vehicle 100 having a network 102 such as a J1939 compliant network, however other CAN networks, such as the CAN-open communication system or others could be utilized in various other embodiments. Once again, the engine 104, transmission 106, instrument cluster 108, entertainment system 110 and the OBD-II port 112 can communicate utilizing wires 114 (actually a wire pair) as is known by that standard. It may be possible that other chassis diagnostic networks may have other components other than an OBD-II port II in the future.

However, that standard also has the capability of utilizing additional information not normally tracked on a chassis 3. Specifically, the J1939 standard of the chassis 3 communicates information via parameter group numbers (PGNs) which are an ID number then followed by a data block which is typically eight bytes of data which generally relate to one or more suspect parameter numbers (SPN's). For a given PGN number there may be one or more SPN numbers that follow that particular PGN number. For instance, PGN 1234 may be an engine related PGN number that correlates to such information as RPM as one SPN number, oil pressure as a second SPN number, and/or oil temperature as a third SPN number, etc. An SPN number may require more than one of the eight bytes of available data for a PGN. Looking at a table in the standard, one would know what the first byte or SPN number could be associated with RPM of that particular PGN number (i.e., 1234). More than one SPNs could follow a single PGN, or possibly only a single SPN could follow a specific PGN (and any number in between 1 and 8 depending upon the table).

While the standard certainly works well, built into the standard are a subset of PGNs which are either unused or for "proprietary use," meaning that they are not preassigned for specific uses and available for various parties to use for various applications.

The applicant has therefore decided to use a number of the PGNs together with specific SPNs designated by the applicant for various information related to the utility service body 5 such as for a refuse style utility service body 5 could be identifying a position of the joystick 114 (which moves a grabber arm) to provide joystick position in a number SPN values such as an X axis position, a Y axis position, etc. A grabber arm position could also be represented in various bytes of data through a grab arm sensor or position sensor 116 which could be representing various bytes, such as from one or more coordinate systems. Other information could also be provided through connections at 118 and 120 (and/or others which could be sensors or other operator interface devices, broadly defined herein as sensors) directly onto the wiring 122 as is used by the network 102 using PGNs with various SPNs which is different than requiring individual wiring systems which utilize wires 36, 38, 40, 42 of the prior art systems to communicate directly to the transmitter 24 and not through the CAN communication wires 122 of the J1939 system common to the vehicle and as are communicated to and from the engine, transmission, etc., and to/from the OBD-II interface, or other chassis diagnostic network interface.

Specifically, other sensors 116,118,120 and/or others could be utilized in other embodiments so as to provide at least one, if not a plurality of sensors 116,118,120 to sense attributes of the function of the utility service body 5 and/or upfit as body data. Functions monitored could include at least one or more of electrical signals, pneumatic operations, hydraulic operations, physical locations/movement and/or other body control information, temperatures, weights, data collection and/or communication features, productivity information, utility service body health and/or system information, presence, absence and/or movement of items or other payload information, pressures and/or other attributes of various utility service bodies 5 separate from the chassis 3.

Functions could be monitored and/or sensed with various interface devices and/or sensors 116,118,120 of various kinds which could monitor any of electrical signals, pneumatic operations, hydraulic operations, physical locations/movement and/or other body control information, temperatures, weights, data collection and/or communication features, productivity information, utility service body health and/or system information, presence, absence and/or movement of items or other payload information, pressures and/or other attributes of various utility service bodies 5 separate from the chassis 3 for various functions of the utility service body 5 which could include an of emergency service bodies such as fire truck bodies, ambulance bodies, etc., tow truck bodies, cement mixers, railroad service vehicles, cranes, dump trucks, drills, augers, hoists, cranes, vehicles with compressed natural gas (CNG) storage systems, short/regional haul vehicles, like those utilized for package delivery, transmission/distribution vehicles such as those used to install utilities of various providers, and/or other bodies 5.

Transmitter 124 which could have its own GPS 126. The entertainment system 110 could have a separate GPS providing similar information or GPS data could certainly be provided from a GPS device configured to provide J1939 protocol data from other connections such as 118, 120 or others. Accordingly, while still providing similar components as the joystick sensors 28 as well as the grab arm position sensor 30 shown in FIG. 1 and likely others, now shown as elements 114, 116 in FIG. 2, not only can data be sent from the various sensors 114, 116 to the transmitter 124, but now data can also be directly used from the communication network 102 by those components, such as joystick 114 and grab arm position sensor 116, etc. Specifically, it may be required that the transmission be in a specific gear and/or the engine to be at a specific RPM, etc. to allow for the joystick movement to provide a suitable signal change position of the grabber arm position, etc. Other chassis information may be used for various other actions. Other utility service bodies 5 may use other data for various uses.

Transmitter 124 can send data through cell phone communications or otherwise possibly through the internet 80 to a remote computer 82 for processing and/or providing information to a refuse company. The computer 82 has software configured to receive the data and process it such route optimization software and possibly other software functions are performed possibly in near to real time if not real time (as events occur).

A separate controller 150 may be used as is shown in FIG. 2 to accumulate body accessory data and then provide instructions to allow for the use of certain information based upon the vehicle body using J1939 protocols. This is believed to be a significant advance over prior art systems which can now only transmit information but not receive information from the J1939 compliant devices using J1939 communication protocol. Additionally, by multiplexing information along the wire(s) 114, which are typically updated at least once every 100 milliseconds, the ability to coordinate and communicate data through the network 102 is believed to be greatly enhanced particularly as it relates to the body information and systems 152. This may prove to be a great advantage with various utility service bodies 5.

With all the data being provided through PGN and SPN numbers through the OBD-II transmitter, efficiency in processing the data by the software remotely disposed relative to the separate receipt and sending form the IOX port(s) is also believed to be enhanced as a separate set of protocols and analyzers are not believed to be necessary remotely with the software utilized by the refuse companies to process data as received and then coordinate with the J1939 data remotely.

Figure 3:
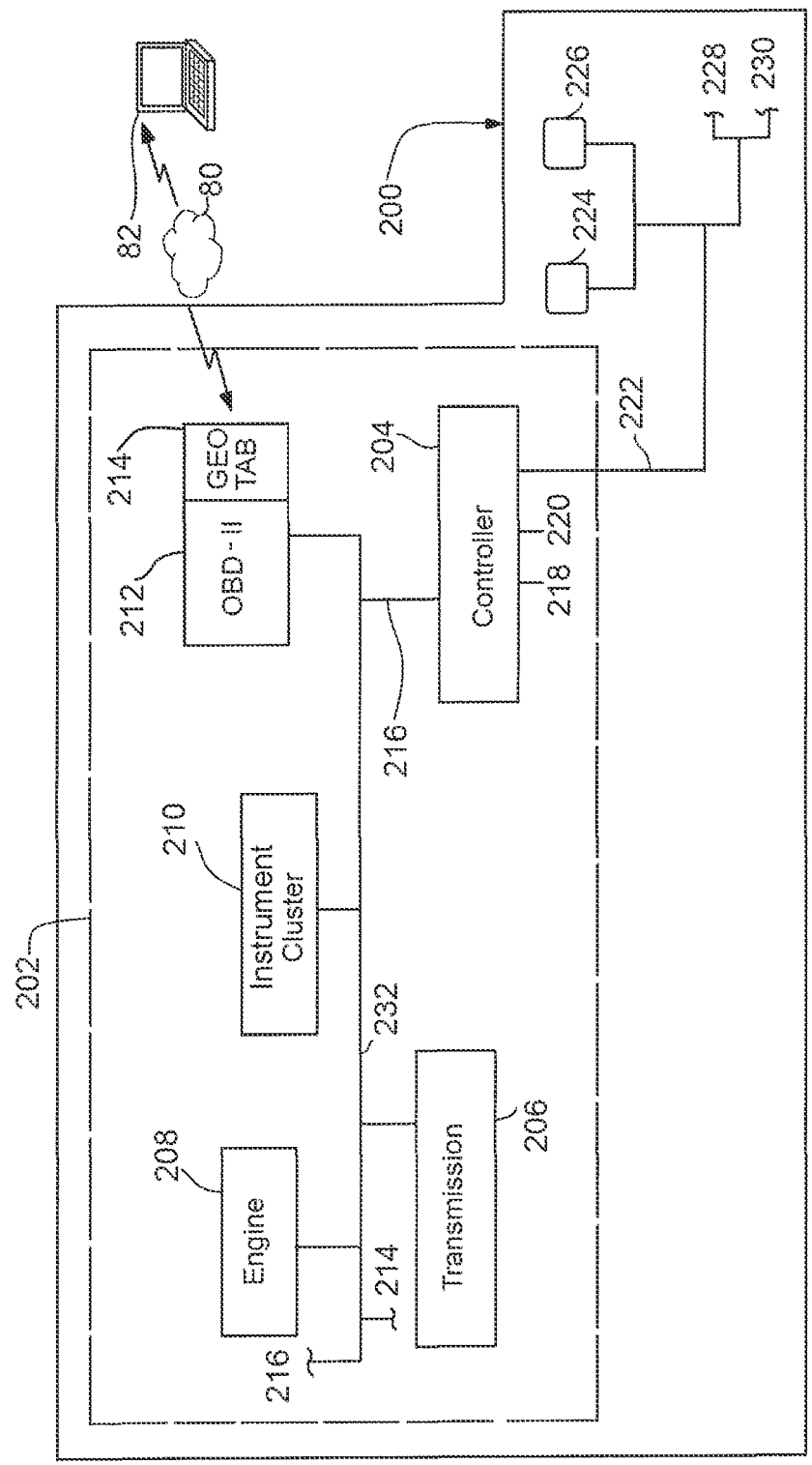
FIG. 3 is a schematic representation of an alternatively preferred embodiment of the present invention.

FIG. 3 is an alternatively preferred embodiment of a vehicle 200 with a first communications network 202 which could be J1939. The applicant provides a controller 204 in addition to the various chassis devices such as transmission 206, engine 208, entertainment system 210, OBD-II 212 and various other items to communicate such as through locations 214, 216, and others. Once again, a transmitter 214 can be connected thereto to communicate across various wireless networks such as ultimately to the internet and to computers for displaying route optimization information and various other information to a company, such as a garbage company for refuse vehicles 1, or for any of a variety of other companies which may utilize other utility service bodies 5 having capabilities either including and/or performing other functions other than garbage collection.

In this embodiment, controller 204 has up to four communication networks illustrated through the connections 216, 218, 220, 222. Second communications network 222 is shown communicating with joystick 224, grabber arm 226 and various other connections 228, 230. This way, information provided through communication network 222 to the various body devices can be received by controller 204 and/or controlled by controller 204 while through a separate CAN data (whether J1939 or other forms) may be coordinated with information received from and sent the body through connection 216 and others as J1939 data. Controller 204 can receive information from wire 232 connected to all the various other components on the communications network 202. This is certainly an option for many embodiments. The communications network 222 can be a CANopen network, communicate with the J1939 protocol through the controller or otherwise communicate.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of upfitting a refuse collection vehicle, the method comprising:
   receiving the refuse collection vehicle, the refuse collection vehicle comprising:

a chassis comprising a vehicle bus configured to transmit data according to a first transmission protocol; and a refuse service body physically coupled to the chassis, the refuse service body comprising a service body bus having a second transmission protocol;

communicatively coupling the service body bus to the vehicle bus via a controller; and configuring the controller to perform the steps of:
receiving body data communicated through the service body bus via the second transmission protocol;
processing received body data; and
transmitting processed body data through the vehicle bus via the first transmission protocol.

2. The method of claim 1, wherein the vehicle bus comprises one of a CAN bus or a CAN open network.

3. The method of claim 1, wherein the refuse service body comprises a grabber arm, and wherein the body data comprises data corresponding to a position of the grabber arm.

4. The method of claim 1, wherein the refuse service body further comprises an arm control joystick, and wherein the body data further comprises data corresponding to a position of the arm control joystick.

5. The method of claim 1, further comprising: configuring a transmitter to:
receive the processed body data over the vehicle bus; and
transmit the processed body data over a wireless network to a remote computing device.

6. The method of claim 5, wherein the transmitter comprises an integrated GPS device.

7. The method of claim 1, further comprising: configuring the controller to transmit the processed body data to an OBD II port.

8. The method of claim 1, wherein the second transmission protocol comprises an IOX protocol.

9. The method of claim 1, further comprising: configuring the controller to:
receive, from the vehicle bus via the first transmission protocol, vehicle data corresponding to operation of at least one of a plurality of vehicle components;
process the vehicle data; and
regulate operation of the refuse service body based on the processed vehicle data.

10. The method of claim 9, further comprising: configuring the controller to regulate operation of at least one of a grabber arm or an arm control joystick.

11. The method of claim 9, wherein the vehicle data comprises an engine RPM.

12. The method of claim 9, wherein the vehicle data comprises a transmission gear.

13. A method of upfitting a refuse collection vehicle, the method comprising:
receiving the refuse collection vehicle, the refuse vehicle comprising:
a chassis supporting a plurality of vehicle components and comprising a Controller Area Network (CAN) vehicle bus configured to transmit data according to a first J1939 transmission protocol in which each of the vehicle components is assigned a Parameter Group Number (PGN)/Suspect Parameter Number (SPN) combination in the CAN vehicle bus; and a refuse service body physically coupled to the chassis, the refuse service body comprising a service body bus having a second transmission protocol;

communicatively coupling the service body bus to the CAN vehicle bus via a controller;

configuring the controller to perform the steps of:
receiving body data communicated through the service body bus via the second transmission protocol;
processing received body data; and
transmitting processed body data through the vehicle bus via the first J1939 transmission protocol; and
assigning the processed body data to a PGN/SPN combination unassigned to the vehicle components.

14. The method of claim 13, wherein the refuse service body comprises a grabber arm, and wherein the body data comprises data corresponding to a position of the grabber arm.

15. The method of claim 13, wherein the refuse service body further comprises an arm control joystick, and wherein the body data further comprises data corresponding to a position of the arm control joystick.

16. The method of claim 13, further comprising: configuring a transmitter to:
receive the processed body data over the vehicle bus; and
transmit the processed body data over a wireless network to a remote computing device.

17. The method of claim 13, further comprising: configuring the controller to transmit the processed body data to an OBD II port.

18. The method of claim 13, further comprising: configuring the controller to:
receive, from the CAN vehicle bus via the first J1939 transmission protocol, vehicle data corresponding to operation of at least one of a plurality of vehicle components;
process the vehicle data; and
regulate operation of the refuse service body based on the processed vehicle data.

19. The method of claim 18, further comprising configuring the controller to regulate operation of at least one of a grabber arm or an arm control joystick.

20. A method of upfitting a refuse collection vehicle, the method comprising:
receiving the refuse collection vehicle, the refuse vehicle comprising:
a chassis comprising a vehicle bus configured to transmit data according to a first transmission protocol; and
a refuse service body physically coupled to the chassis, the refuse service body comprising a service body bus having a second transmission protocol;
communicatively coupling the service body bus to the vehicle bus via wiring;
communicatively coupling a controller to the wiring; and
configuring the controller to perform the steps of:
receiving body data communicated through the service body bus via the second transmission protocol;
processing received body data; and
transmitting processed body data through the vehicle bus via the first transmission protocol.

* * * * *